United States Patent
Usui et al.

(10) Patent No.: US 6,865,924 B2
(45) Date of Patent: Mar. 15, 2005

(54) DRIFT DETECTION METHOD FOR A CONTROL APPARATUS CONTROLLING AN INJECTION MOLDING MACHINE

(75) Inventors: Kazuo Usui, Nagano (JP); Susumu Morozumi, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 31 days.

(21) Appl. No.: 09/799,513

(22) Filed: Mar. 7, 2001

(65) Prior Publication Data

US 2001/0020382 A1 Sep. 13, 2001

(30) Foreign Application Priority Data

Mar. 7, 2000 (JP) ........................................ 2000-062228

(51) Int. Cl.⁷ .............................................. G01L 27/00
(52) U.S. Cl. ........................ 73/1.61; 73/1.62; 264/40.5; 425/149
(58) Field of Search ................................ 73/1.57, 1.59, 73/1.61, 1.62; 264/40.5, 40.1; 425/145, 149

(56) References Cited

U.S. PATENT DOCUMENTS

| | | | | |
|---|---|---|---|---|
| 3,937,776 A | * | 2/1976 | Hold et al. ................. | 264/40.1 |
| 4,889,667 A | * | 12/1989 | Kojima et al. .............. | 264/40.1 |
| 5,533,884 A | * | 7/1996 | Nakamura et al. ......... | 264/40.5 |
| 5,553,481 A | * | 9/1996 | Arai ............................ | 425/170 |
| 5,567,367 A | * | 10/1996 | Ito et al. ..................... | 264/40.5 |
| 5,997,780 A | * | 12/1999 | Ito et al. ..................... | 264/40.5 |
| 2001/0030375 A1 | * | 10/2001 | Kamiguchi et al. | |
| 2001/0042934 A1 | * | 11/2001 | Usui et al. | |

FOREIGN PATENT DOCUMENTS

| | | | | |
|---|---|---|---|---|
| JP | 36077 | * | 3/1977 | ................. 73/1.63 |
| JP | 63288726 A | * | 11/1988 | ........... B29C/45/76 |
| JP | 237901 | * | 9/1993 | |
| JP | B2767720 | | 7/1995 | |
| JP | 232366 | * | 9/1995 | |
| JP | 10024468 A | * | 1/1998 | ........... B29C/45/50 |

* cited by examiner

Primary Examiner—Hezron Williams
Assistant Examiner—Nashmiya Fayyaz
(74) Attorney, Agent, or Firm—Birch, Stewart, Kolasch & Birch, LLP

(57) ABSTRACT

In a drift detection method for detecting drift in a pressure detection value output from a pressure detector, pressure is detected by the pressure detector at a preset detection point in a pressure-uncontrolled region in an arbitrary molding cycle. The detected pressure is set as a reference pressure. Pressure is detected by the pressure detector at the same detection point in the pressure-uncontrolled region in a subsequent molding cycle. A deviation of the detected pressure from the reference pressure is obtained. When the deviation is greater than a preset value, it is determined that a drift is present, and processing for coping with the drift is performed.

4 Claims, 5 Drawing Sheets

US 6,865,924 B2

DRIFT DETECTION METHOD FOR A CONTROL APPARATUS CONTROLLING AN INJECTION MOLDING MACHINE

BACKGROUND OF THE INVENTION

1. Field of the Invention

The present invention relates to a drift detection method for a control apparatus controlling an injection molding machine, which method detects drift in a pressure detection value output from a pressure detector such as a load cell.

2. Description of the Relevant Art

As disclosed in Japanese Patent Publication (kokoku) No. 7(1995)-67720, in general, a control apparatus for controlling an injection molding machine includes a pressure control system which controls pressure such as injection pressure or back pressure, through feedback control, on the basis of a preset pressure command value and a pressure detection value output from a pressure detector such as a load cell. Such a control apparatus performs zero-point adjustment for the pressure detection value output from the pressure detector (load cell), in order to compensate for variation in the characteristics of the pressure detector itself and a mechanical error present at a portion where the pressure detector is attached. However, since the zero point set through an initial adjustment frequently drifts due to, for example, change in the external environment or long-term variation, in general, zero-point adjustment (re-adjustment) for eliminating drift is performed regularly or as needed.

An example method for performing such zero-point adjustment is disclosed in Japanese Patent No. 2657352. In this method, a pressure detection value is obtained in a predetermined period during operation of an injection molding machine in which the pressure detection value theoretically becomes zero, such as a predetermined period after completion of initialization performed when power is activated or a predetermined period after completion of an injection step; and correction is performed on the basis of the thus-obtained pressure detection value.

However, the above-described conventional method has the following drawbacks to be solved.

First, in the conventional method, an absolute zero point is detected in order to correct for drift on the basis of the zero point. However, drift cannot be detected accurately and stably, because the zero point tends to be influenced by disturbances such as variation in position of a screw.

Second, since detection and correction are performed in a predetermined period during operation of an injection molding machine in which the pressure detection value theoretically becomes zero, the conventional method is restricted with respect to the period (time) for performing correction, thereby lowering the degree of flexibility in performing detection processing and correction processing.

SUMMARY OF THE INVENTION

An object of the present invention is to provide a drift detection method for a control apparatus controlling an injection molding machine, which method monitors a relative deviation, without detecting an absolute zero point, in order to avoid influence of disturbances such as variation in screw position, to thereby enable accurate and stable drift detection.

Another object of the present invention is to provide a drift detection method for a control apparatus controlling an injection molding machine, which method utilizes not only a period in which the pressure detection value theoretically becomes zero but also the entirety of a time region in which pressure control is not performed (hereinafter referred to as a "pressure-uncontrolled region") in order to mitigate the restriction on the period for detection and correction, to thereby greatly increase the degree of flexibility in performing detection processing and correction processing.

In order to achieve the objects as described above, a drift detection method of the present invention comprises the steps of: detecting, by use of a pressure detector, pressure at a preset detection point in a pressure-uncontrolled region in an arbitrary molding cycle; setting the detected pressure as a reference pressure; detecting, by use of the pressure detector, pressure at the same detection point in the pressure-uncontrolled region in a subsequent molding cycle; obtaining a deviation of the detected pressure from the reference pressure; and determining that a drift is present when the deviation is greater than a preset value and performing processing for coping with the drift.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of an injection molding machine M equipped with a control apparatus 1 which can perform a drift detection method according to the present embodiment will be described with reference to FIGS. 2 and 3.

Figure 2:
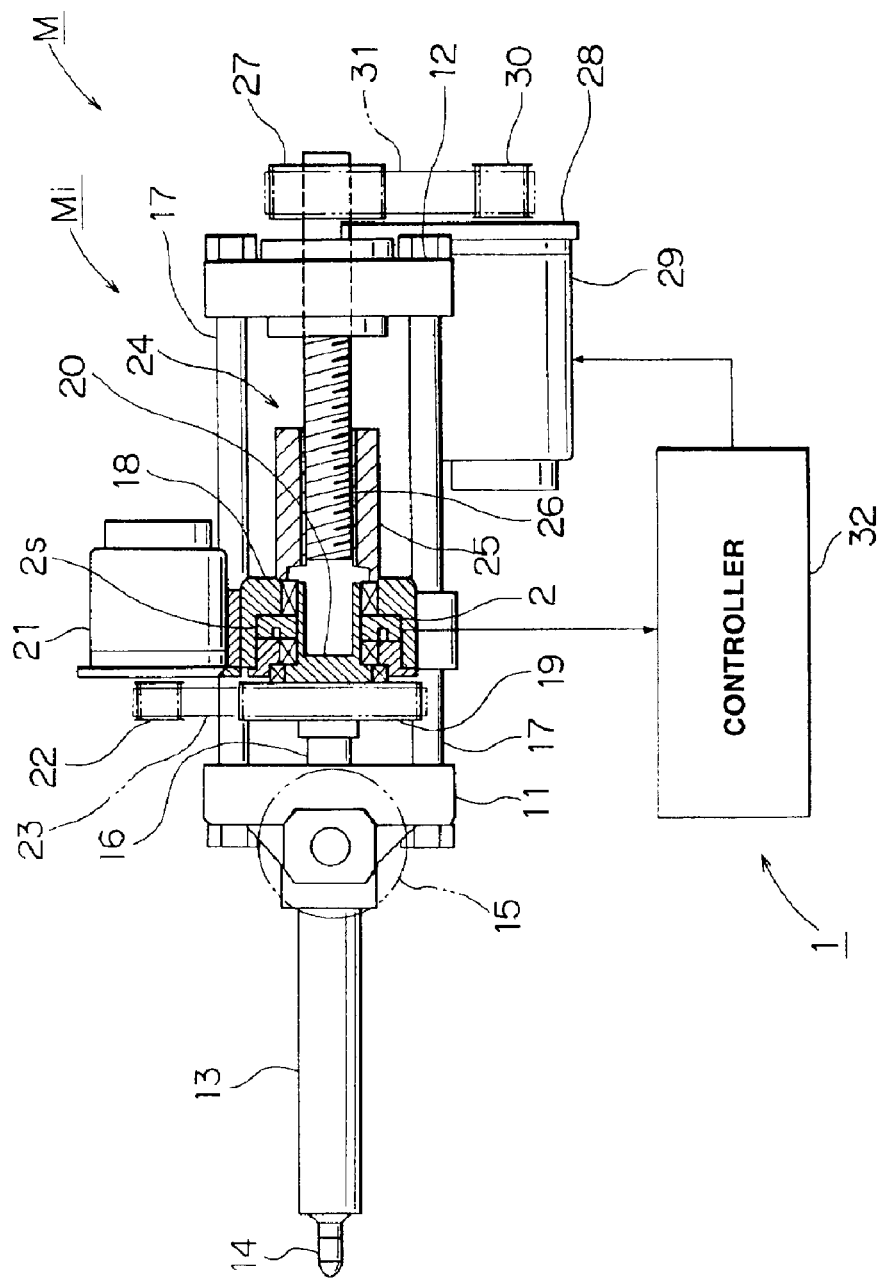
FIG. 2 is a partially-sectioned plan view of an injection molding machine equipped with a control apparatus which can carry out the drift detection method.

The injection molding machine M shown in FIG. 2 includes only an injection unit Mi, with a mold-clamping apparatus omitted. The injection unit Mi includes an injection base 11 and a drive base 12, which are disposed to be separated from each other. The rear end of a heating cylinder 13 is attached to the front face of the injection base 11. The heating cylinder 13 has an injection nozzle 14 at its front end and a hopper 15 at its rear portion. Molding material is supplied to the heating cylinder 13 from the hopper 15. A screw 16 is inserted into the heating cylinder 13. Four tie bars 17 are disposed to extend between the injection base 11 and the drive base 12; and a slide block 18 is slidably mounted on the tie bars 17. A rotary block 20 having a driven pulley 19 formed integrally therewith is rotatably supported at the front end of the slide block 18; and the rear end of the screw 16 is connected to the center of the rotary block 20. A servomotor 21 for screw rotation is attached to a side surface of the slide block 18; and an endless timing belt 23 is extended between and wound around the driven pulley 19, and a drive pulley 22 fixed to the rotary shaft of the servomotor 21. Thus, a drive mechanism for rotating the screw 16 is constructed.

A nut member 25 is attached to the rear end of the slide block 18 to be coaxial with the screw 16; and a front-side portion of a ball screw 26 rotatably supported on the drive base 12 is in screw-engagement with the nut member 25. Thus, a ball-screw mechanism 24 is constructed. Moreover, a driven pulley 27 is attached to the rear end of the ball screw 26 projecting rearward from the drive base 12; and a servomotor 29 for screw reciprocation is attached to a support plate 28 attached to the drive base 12. An endless timing belt 31 is extended between and wound around the driven pulley 27, and a drive pulley 30 fixed to the rotary shaft of the servomotor 29. Thus, a drive mechanism for reciprocating the screw 16 is constructed.

Figure 3:
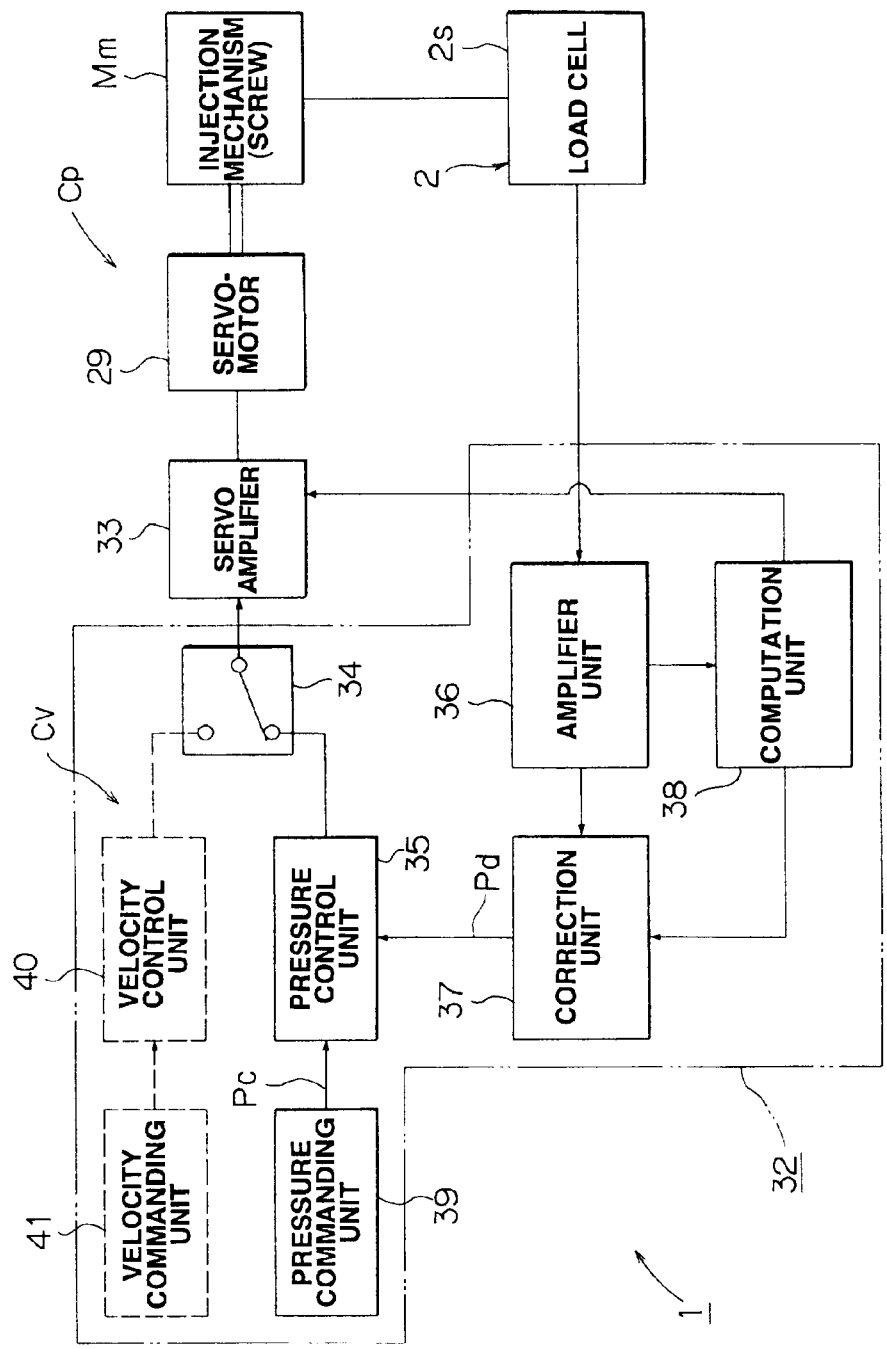
FIG. 3 is a block diagram showing a main portion of the control apparatus.

Reference numeral 1 denotes a control apparatus which includes a pressure control system Cp (FIG. 3). Reference numeral 2s denotes a load cell (pressure detector 2) for detecting pressure applied to the screw 16. The load cell 2s is interposed between the rotary block 20 and the slide block 18 and is connected to a controller 32 for driving and controlling the servomotor 29 for screw reciprocation.

FIG. 3 is a block diagram showing a specific structure of the controller 32. In FIG. 3, reference numeral 29 denotes the above-described servomotor; and reference character Mm denotes an injection mechanism including the screw 16 and the ball screw mechanism 24 driven by the servomotor 29. The servomotor 29 is connected to the output section of a servo amplifier 33; and the input section of the servo amplifier 33 is connected to the output section of a pressure control unit 35 via a switch function unit 34. The load cell 2s is connected to the input section of an amplifier unit 36; and the output section of the amplifier unit 36 is connected to the input section of a correction unit 37 and the input section of a computation unit 38. Processing in the correction unit 37 and processing in the computation unit 38 are performed by means of a computer function of the controller 32. The output section of the correction unit 37 is connected to the input section of the pressure control unit 35. A pressure command value Pc is supplied from a pressure commanding unit 39 to the pressure control unit 35. The output section of the computation unit 38 is connected to the servo amplifier 33 and the correction unit 37. Reference character Cv denotes a velocity control system including a velocity control unit 40 and a velocity commanding unit 41. When velocity control is effected by the velocity control system Cv, the switch function unit 34 is operated to connect the velocity control unit 40 to the servomotor 33.

Figure 1:
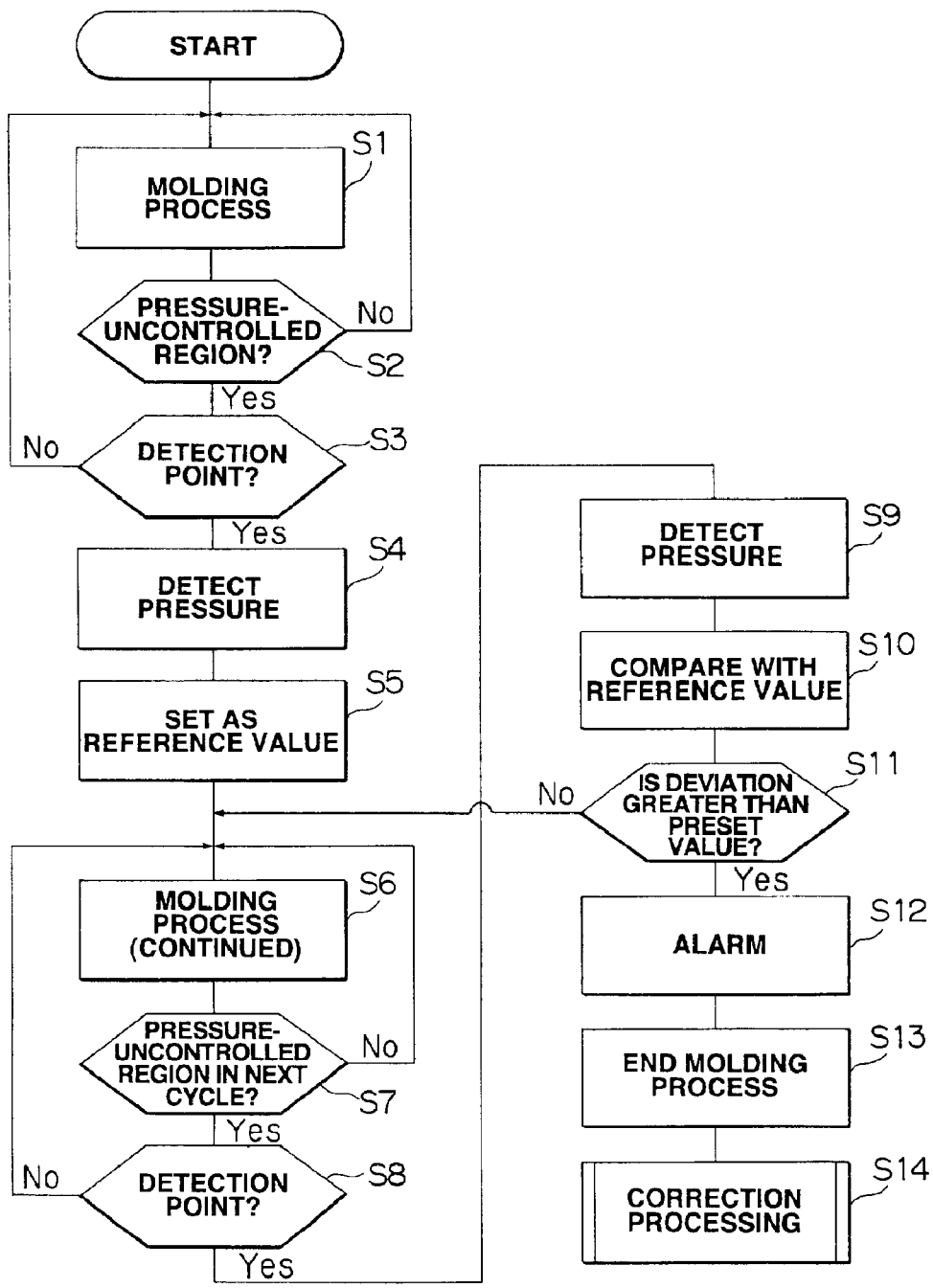
FIG. 1 is a flowchart showing the steps of a drift detection method according to an embodiment of the present invention.

Next, the drift detection method according to the present embodiment implemented in the control apparatus 1 will be described with reference to FIGS. 2 and 3 and in accordance with the flowchart shown in FIG. 1.

First, the controller 32 sets in advance a detection point in a pressure-uncontrolled region in a molding cycle. The pressure-uncontrolled region refers to a region in which pressure control on the basis of a pressure command value is not performed. Examples of the pressure-uncontrolled region include a velocity control region in which feedback control of velocity is effected, and a screw stopping period between a measuring step and an injection step. The detection point is set in the pressure-uncontrolled region by reference to screw position or time. Specifically, in the case of the velocity control region, a position which the screw 16 has reached through advancement over a predetermined distance after commencement of injection (or a point in time when a predetermined period of time has elapsed after commencement of injection) can be set as a detection point. In the case of the screw stopping period between measuring and injection steps, a position at which decompression processing for retracting the screw 16 over a predetermined distance (or to a predetermined position) after completion of the measuring step has ended can be set as a detection point.

Drift detection is performed as follows, under the assumption that the injection molding machine M is operating at the present and an ordinary molding process (molding cycle) is performed (step S1). The controller 32 monitors the progress of the molding process, judges whether the above-described pressure-uncontrolled region has come in a certain molding cycle (step S2), and if so, judges whether the preset detection point has come (step S3). The certain molding cycle is preferably a molding cycle which is performed in a stable state after a few shots of molding have been performed after the start of operation of the injection molding machine M.

When the controller 32 has entered the pressure-uncontrolled region in the certain molding cycle and has reached the preset detection point, the controller 32 detects pressure applied to the screw 16, by use of the load cell 2s (step S4). The detection signal output from the load cell 2s is fed to the amplifier unit 36 where the detection signal is amplified and noise is removed from the detection signal by a noise filter. Thus, a pressure detection value Pd indicative of the detected pressure is obtained. The pressure detection value Pd is fed to the computation unit 38 and is stored as a reference value Ds indicative of a reference pressure (step S5). Notably, the reference value Ds is not necessarily zero but in general has a predetermined magnitude.

Since the molding process is continued without being affected by the above-described detection processing, through monitoring, the controller 32 judges whether the pressure-uncontrolled region has come in a subsequent molding cycle, and, if so, judges whether the preset detection point has come (step S6, S7, S8). The subsequent molding cycle may be a molding cycle performed immediately after the above-described certain molding cycle or a molding cycle performed after performance of one or two additional molding cycles after the above-described certain molding cycle.

When the controller 32 has entered the pressure-uncontrolled region in the subsequent molding cycle and has reached the detection point, the controller 32 detects pressure applied to the screw 16, by use of the load cell 2s (step S9). The detection signal output from the load cell 2s is fed to the amplifier unit 36, so that a pressure detection value Pd indicative of the detected pressure is obtained. The pressure detection value Pd is fed to the computation unit 38 as a present value Dn indicative of the present pressure. The computation unit 38 obtains a deviation (error) Eo of the present value Dn from the reference value Ds (i.e., a deviation of the present pressure from the reference pressure) through calculation (step S10). When the thus-obtained deviation Eo is greater than a preset value Es, the controller 32 judges that a drift is present, and performs processing for coping with the drift (step S11 to step S14). That is, the controller 32 performs report processing for reporting the detection of drift through, for example, display of an alarm message (step S12), ends the molding process (step S13), and performs correction processing for performing zero-point adjustment such that the obtained deviation Eo becomes zero, to thereby eliminate the drift (step S14).

Figure 4:
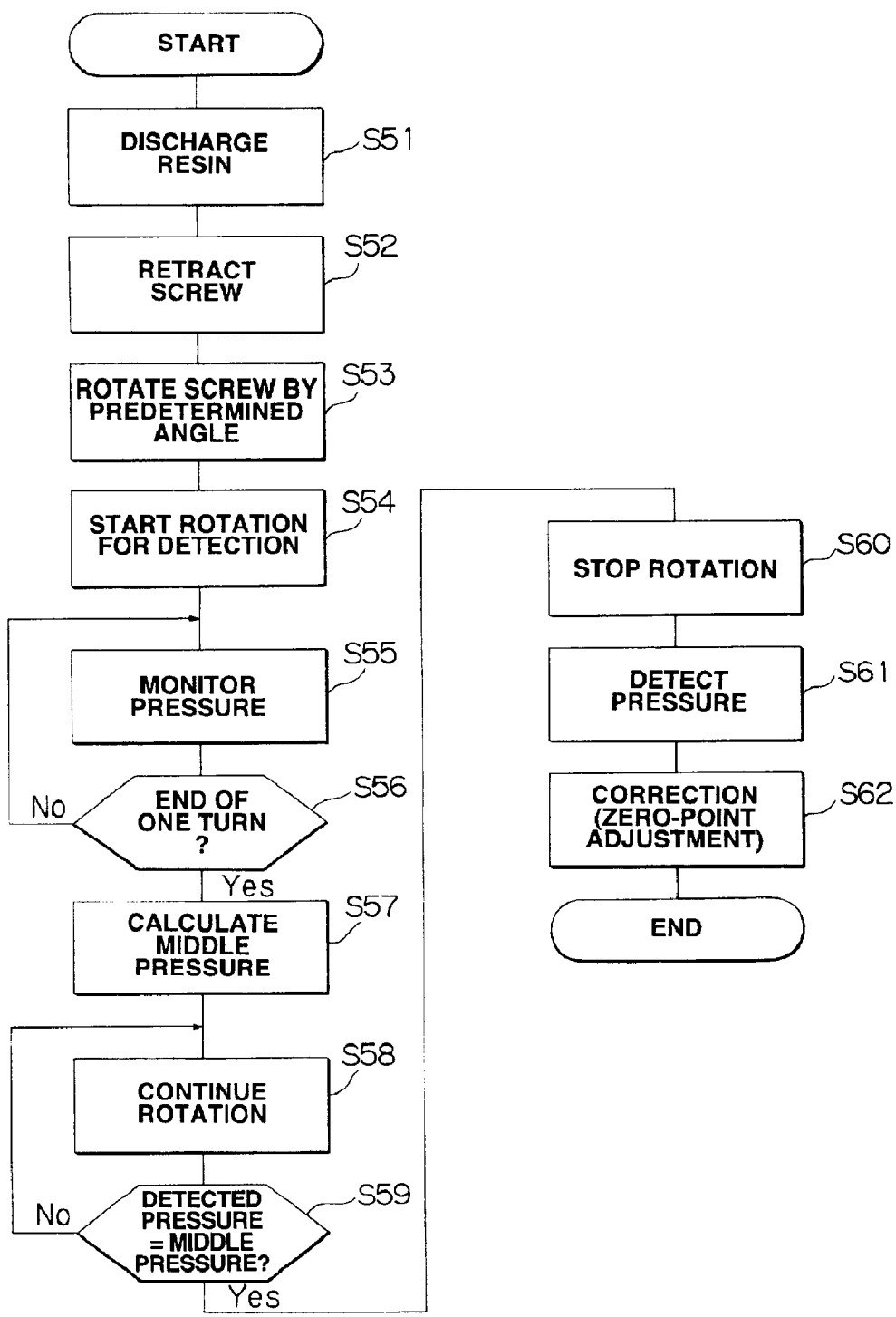
FIG. 4 is a flowchart showing correction processing which is performed as a portion of the drift detection method.

Next, an example of the correction processing will be described in accordance with the flowchart shown in FIG. 4 and with reference to FIG. 5.

Before performance of correction, the molding process is ended. First, the controller 32 advances the screw 16 in order to discharge from the injection nozzle 14 resin remaining within the heating cylinder 13 (step S51). Subsequently, the controller 32 retracts the screw 16 slightly in order to remove residual load which acts from the front side and which is produced by resin which has not been discharged (step S52). Further, the controller 32 rotates the screw 16 by a predetermined angle (e.g., about 180°) in order to remove residual load which acts from the circumferential direction and which is produced by mechanical parts such as bearings (step S53).

After completion of the above-described processing, the controller 32 rotates the screw 16 by one turn or more (step S54). This rotation of the screw 16 may be performed continuously after the rotation of the screw 16 effected in step S53 without stoppage. During this rotation, the pressure applied to the screw 16 is detected by use of the load cell 2s. The detection signal output from the load cell 2s is fed to the amplifier unit 36, where the detection signal is amplified and noise is removed from the detection signal by a noise filter. Thus, a pressure detection value Pd indicative of the detected pressure is obtained. The pressure detection value Pd is fed to the correction unit 37 and the computation unit 38.

Figure 5:
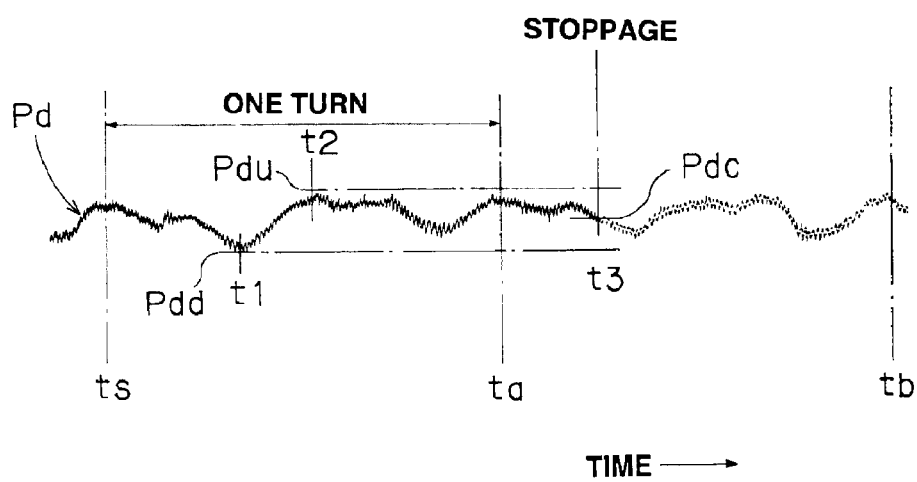
FIG. 5 is a time chart showing variation in pressure detected during the correction processing which is performed as a portion of the drift detection method.

As shown in FIG. 5, the pressure detection value Pd represents an error caused by ripples produced with rotation of the screw 16. Therefore, the computation unit 38 monitors the pressure detection value Pd indicative of the detected pressure (step S55) in order to detect the minimum value Pdd and the maximum value Pdu of the pressure detection value Pd. That is, when it is assumed that time ts in FIG. 5 is a time at which rotation to be performed over one turn or more has started in step S54, the computation unit 38 monitors the pressure detection value Pd in a period from the time ts to time ta when the screw 16 has rotated one turn. After the screw 16 has rotated one turn, the computation unit 38 detects the minimum value Pdd and the maximum value Pdu of the pressure detection value Pd, and, through calculation, obtains a middle value Pdc between the minimum value Pdd and the maximum value Pdu (steps S56, S57). The middle value Pdc is not necessarily the center between the minimum value Pdd and the maximum value Pdu, but may be offset from the center at a predetermined ratio, toward the minimum value Pdd or toward the maximum value Pdu.

While the screw 16 is rotated continuously, the computation unit 38 monitors the pressure detection value Pd. When the monitored pressure detection value Pd reaches the above-described middle value Pdc, the controller 32 stops the screw 16 (steps S58, S59, S60). In the case shown in FIG. 5, the pressure detection value Pd reaches the middle value Pdc at time t3 after the time ta. Therefore, the controller 32 stops the screw 16 at the time t3. When the screw 16 has stopped, the controller 32 detects the pressure acting on the screw 16; i.e., the pressure detection value Pd (step S61). Subsequently, the correction unit 37 performs zero-point adjustment (correction) such that the pressure detection value Pd assumes an initial value (zero) (step S62).

The basic operation of the pressure control system Cp will be described. When the pressure detection value Pd is fed to the input section of the pressure control unit 35, the pressure control unit 35 compares the pressure detection value Pd with the pressure command value Pc fed from the pressure commanding unit 39, in order to obtain a deviation. The pressure control unit 35 produces a control signal for eliminating the deviation. The control signal is fed to the servomotor 29, whereby feedback control for pressure is effected.

In the drift detection method according to the present invention, pressure is detected, by use of the pressure detector 2, at a preset detection point in a pressure-uncontrolled region in an arbitrary molding cycle; a pressure detection value Pd indicative of the detected pressure is set as a reference value Ds; pressure is detected, by use of the pressure detector 2, at the same detection point in the pressure-uncontrolled region in a subsequent molding cycle; a deviation Eo of the pressure detection value Pd (present value Dn) from the reference value Ds is calculated; and when the deviation Eo is greater than the preset value Es, processing for coping with the detected drift is performed. Therefore, there can be utilized not only a period in which the pressure detection value Pd theoretically becomes zero, which has conventionally been utilized, but also the entirety of a pressure-uncontrolled region. Therefore, the restriction on the period (time) for correction is mitigated, and the degree of flexibility in performing detection processing and correction processing is increased greatly. In addition, the drift detection method according to the present invention does not detect an absolute zero point, but monitors a relative deviation. Therefore, the drift detection method is hardly influenced by disturbances such as variation in screw position, thereby enabling accurate and stable drift detection.

While the present invention has been described with reference to the preferred embodiment, the present invention is not limited thereto. Regarding structural details, shape, technique, among others, modifications and any omission or addition may be possible as needed without departing from the scope of the invention. For example, sensors other than the load cell 2s may be used as the pressure detector 2.

What is claimed is:

1. A drift detection method for detecting drift in a pressure detection value output from a pressure detector used in a control apparatus for controlling an injection molding machine, the method comprising the steps of:

detecting, by use of the pressure detector, a first pressure at a preset detection point in a pressure-uncontrolled region in an arbitrary molding cycle;

setting the detected pressure as a reference pressure;

detecting, by use of the pressure detector, a second pressure at the preset detection point in the pressure-uncontrolled region in a subsequent molding cycle;

obtaining a deviation of the detected pressure from the reference pressure; and performing correction processing for eliminating drift when the deviation is greater than a preset value, wherein the correction processing comprises the steps of:

rotating a screw by one turn;

obtaining a middle value between a minimum value and a maximum value of a pressure detection value output from the pressure detector during the one-turn rotation, the pressure detection value representing an error caused by ripples produced with rotation of the screw;

rotating the screw further and stopping the screw when the pressure detection value output from the pressure detector becomes equal to the middle value; and correcting the pressure detection value after stoppage of the screw.

2. The drift detection method according to claim 1, wherein before the one-turn rotation, the screw is advanced in order to discharge resin remaining in a heating cylinder and is then retracted over a predetermined distance.

3. The drift detection method according to claim 2, wherein after the retraction of the screw over a predetermined distance, the screw is rotated over a predetermined angle.

4. The drift detection method according to claim 1, wherein the correction is zero-point adjustment.

* * * * *